(12) United States Patent
Liegeois et al.

(10) Patent No.: US 8,286,520 B2
(45) Date of Patent: Oct. 16, 2012

(54) ACTUATOR WITH A MAIN ROD AND AN AUXILIARY ROD

(75) Inventors: Pierre-Yves Liegeois, Suresnes (FR); Daniel Bucheton, Le Chesnay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 305 days.

(21) Appl. No.: 12/424,997

(22) Filed: Apr. 16, 2009

(65) Prior Publication Data

US 2009/0260462 A1    Oct. 22, 2009

(30) Foreign Application Priority Data

Apr. 21, 2008  (FR) ...................................... 08 02198

(51) Int. Cl.
*F16H 29/20*    (2006.01)
(52) U.S. Cl. ...................................... 74/89.27; 74/89.26
(58) Field of Classification Search ....... 74/89.26–89.29
See application file for complete search history.

(56) References Cited

U.S. PATENT DOCUMENTS

| | | | | |
|---|---|---|---|---|
| 2,476,376 | A * | 7/1949 | Laraque | 60/709 |
| 6,494,033 | B1 * | 12/2002 | Davies | 60/226.2 |
| 6,791,215 | B2 * | 9/2004 | Tesar | 310/12.24 |
| 7,190,096 | B2 * | 3/2007 | Blanding et al. | 310/112 |
| 7,802,488 | B2 * | 9/2010 | Bucheton et al. | 74/89.23 |
| 2006/0113933 | A1 | 6/2006 | Blanding et al. | |
| 2007/0144846 | A1 * | 6/2007 | Bucheton et al. | 188/297 |

FOREIGN PATENT DOCUMENTS

| | | |
|---|---|---|
| FR | 2 895 483 A1 | 6/2007 |
| GB | 2 272 205 A | 5/1994 |

* cited by examiner

*Primary Examiner* — Troy Chambers
*Assistant Examiner* — Terence Boes
(74) *Attorney, Agent, or Firm* — Sughrue Mion, PLLC

(57) ABSTRACT

A telescopic actuator comprising a cylinder in which a main rod is mounted to slide telescopically along a sliding axis (X) between a retracted position and an extended position. The actuator includes an auxiliary rod mounted to slide in the main rod along the sliding axis between retracted and extended positions. A structure is provided for retaining the auxiliary rod in the retracted position inside the main rod. There also is a brake structure for braking sliding of the auxiliary rod in the main rod in the extension direction. The auxiliary rod has a thread on an outside surface, and the main rod has a rotary bearing that centers the auxiliary rod inside the main rod and co-operates via a reversible helical connection with the thread of the auxiliary rod such that extension of the auxiliary rod causes the rotary bearing to rotate.

4 Claims, 2 Drawing Sheets

Fig.1 - PRIOR ART

ACTUATOR WITH A MAIN ROD AND AN AUXILIARY ROD

The invention relates to an actuator with a main rod and an auxiliary rod.

BACKGROUND OF THE INVENTION

A telescopic actuator is known, in particular from document FR 2 895 483, that comprises a cylinder in which a main rod is mounted to slide telescopically along a sliding axis between a retracted position and an extended position, the telescopic actuator including an auxiliary rod mounted to slide telescopically in the main rod along said sliding axis between a retracted position and an extended position, the actuator including controlled retaining means for retaining the auxiliary rod in the retracted position inside the main rod. Thus, so long as the main rod slides properly in the cylinder, the auxiliary rod remains blocked in the main rod, and the actuator operates like a conventional actuator. If the main rod becomes blocked, it then suffices to control the retaining means so that they release the auxiliary rod, such that the actuator is again free to lengthen and it no longer blocks the movement of the mechanical system in which it is included.

The actuator also includes brake means for braking sliding of the auxiliary rod in the main rod in the extension direction.

Such an actuator is described below with reference to FIG. 1, which is a diagrammatic section view of an actuator of the above-specified type, and is therefore known in itself. The actuator comprises a cylinder 1 defining a cylindrical cavity closed by an end wall 12 carrying a lug 13. A main rod 2 is mounted in the cavity to slide along a sliding axis X and to project to a greater or lesser extent from the cylinder 1 through an open end of the cylinder that constitutes a bearing.

The actuator includes control means for controlling the sliding of the main rod 2 relative to the cylinder 1. These sliding control means comprise:
  a key 3 secured to the main rod 2 and co-operating with a groove 4 formed in the wall of the cavity of the cylinder 1 to prevent the main rod 2 from turning relative to the cylinder 1;
  an electric drive motor 5 comprising a stator 6 mounted stationary in the cylinder 1, and a rotor 7 mounted to rotate inside the cylinder 1 about the axis X;
  a lead screw 9 extending along the axis X and mounted to rotate within the cylinder 1 about the axis X, being driven in rotation by the rotor 7 via a coupler 8. The lead screw 9 is held axially relative to the cylinder 1 by means of a double-acting axial abutment 11; and
  a complementary nut 10 formed in an end wall of the main rod 2 through which the lead screw 9 passes so as to establish a reversible helical connection between the lead screw 9 and the main rod 2.

Thus, rotation of the rotor 7 drives rotation of the lead screw 9 which drives axial displacement of the main rod 2.

The main rod 2 is hollow and defines a cavity in which an auxiliary rod 20 is mounted to slide inside the main rod 2 along the axis X and to project through an open end thereof that forms a bearing.

the actuator further includes controlled retaining means for retaining the auxiliary rod 20 in its retracted position inside the main rod 2. These retaining means comprise:
  a catch 30 extending inside the main rod 2;
  a step 31 provided at the end of the auxiliary rod 20 and adapted to co-operate with the catch 30; and
  a locking sleeve 32 that is axially displaceable by an unlocking motor 33 against a return spring 34 from a locking position (shown in this figure) in which it covers the catch 30 so as to prevent it from expanding radially, and a release position in which it leaves the catch 30 free to expand radially when the step 31 passes therethrough. For this purpose, the unlocking motor 33 comprises a stator 35 secured to the main rod 2, and a rotor 36 that co-operates with a complementary thread of the main rod 2 to constitute a reversible helical connection. Rotation of the rotor 36 thus causes it to move axially. The locking sleeve 32 is carried at the end of the rotor 36 and is mounted thereto by means of rollers so as to be free to rotate.

The actuator includes controlled retaining means for retaining the auxiliary rod 20 in its retracted position inside the main rod 2. These retaining means comprise:
  a catch 30 extending inside the main rod 2;
  a step 31 provided at the end of the auxiliary rod 20 and adapted to co-operate with the catch 30; and
  a locking sleeve 32 that is axially displaceable by an unlocking motor 33 against a return spring 34 from a locking position (shown in this figure) in which it covers the catch 30 so as to prevent it from expanding radially, and a release position in which it leaves the catch 30 free to expand radially when the step 31 passes therethrough. For this purpose, the unlocking motor 33 comprises a stator 35 secured to the main rod 2, and a rotor 36 that co-operates with a complementary thread of the main rod 2 to constitute a reversible helical connection. Rotation of the rotor 36 thus causes it to move axially. The locking sleeve 32 is carried at the end of the rotor 36 and is mounted thereto by means of rollers so as to be free to rotate.

The actuator includes brake means for braking sliding of the auxiliary rod 20 in the main rod 2 in the direction for extending the auxiliary rod 20. These brake means which also form a bearing 21 for guiding the auxiliary rod 20 in the main rod 2 comprise:
  an externally threaded driver 22 that co-operates with internal tapping of the main rod 2 so as to constitute a reversible helical connection between the driver 22 and the main rod 2;
  a bushing 23 mounted to rotate on the auxiliary rod 20 by means of rollers, the driver 22 itself being mounted to rotate on the bushing 23 by means of rollers, the driver 22 being held captive axially between the bushing 23 and the rollers bearing against an abutment 24 of the auxiliary rod 20;
  a ratchet-type freewheel 25 between the driver 22 and the bushing 23 which, when the auxiliary rod 20 is extended from the main rod 2 and the driver 22 turns because of the helical connection with the main rod 2, causes the bushing 23 to rotate. In contrast, when the auxiliary rod 20 returns into the main rod 2, the driver 22 turns but does not drive the bushing 23 in rotation; and
  a friction washer 26 carried by the auxiliary rod 20 facing a free face of the bushing 23 and adapted to generate friction against the bushing 23 when it turns by being pressed against the friction washer 23 under external drive pulling on the auxiliary rod 20;

It should be observed that the auxiliary rod 20 is guided axially firstly by the open end of the main rod 2 and secondly by the bearing 21. The main rod 2 is guided axially firstly by the open end of the cylinder 1 and secondly by co-operation between the nut 10 and the lead screw 9. Finally, the lead screw 9 is guided axially at one end by a ball joint 14 inserted in the double-acting abutment 11, and at the other end by a sliding ball joint 15 which is mounted to slide inside the auxiliary rod 20. By means of these dispositions, there is no need to fit the main rod 2 with a sliding bearing inside the cylinder 1.

OBJECT OF THE INVENTION

An object of the invention is to provide an actuator of the above-specified type in which the braking of the auxiliary rod is improved.

BRIEF SUMMARY OF THE INVENTION

To achieve this object, there is provided a telescopic actuator comprising a cylinder in which a main rod is mounted to slide telescopically along a sliding axis between a retracted position and an extended position, the telescopic actuator including an auxiliary rod mounted to slide telescopically in the main rod along said sliding axis between a retracted position and an extended position, the actuator including controlled retaining means for retaining the auxiliary rod in the retracted position inside the main rod, and the actuator further including brake means for braking sliding of the auxiliary rod in the main rod in the extension direction. According to the invention, the auxiliary rod has a thread on an outside surface, the main rod carrying at its end a rotary bearing that centers the auxiliary rod inside the main rod and that co-operates via a reversible helical connection with the thread of the auxiliary rod such that extension of the auxiliary rod causes the rotary bearing to rotate, the brake means being arranged to brake rotation of the rotary bearing during extension of the auxiliary rod.

Thus, for the purpose of rotating an element to be braked, the arrangement of a thread on the actuator rod, in preference to internal tapping in the main rod, makes it possible to use a smaller pitch, and thus leads to a braking torque that is lower, for a given braking force on the auxiliary rod. The brake means can thus brake the rotary bearing directly without passing, as in document FR 2 895 483, via a multiplier member that increases the speed of rotation of the rotary part that is to be braked.

The brake means then preferably co-operate directly with the rotary bearing and are of the magnetic brake type.

BRIEF DESCRIPTION OF THE DRAWINGS

The invention can be better understood in the light of the following description with reference to the figures of the accompanying drawings, in which, in addition to above-described FIG. 1.

DETAILED DESCRIPTION OF THE INVENTION

Figure 1:
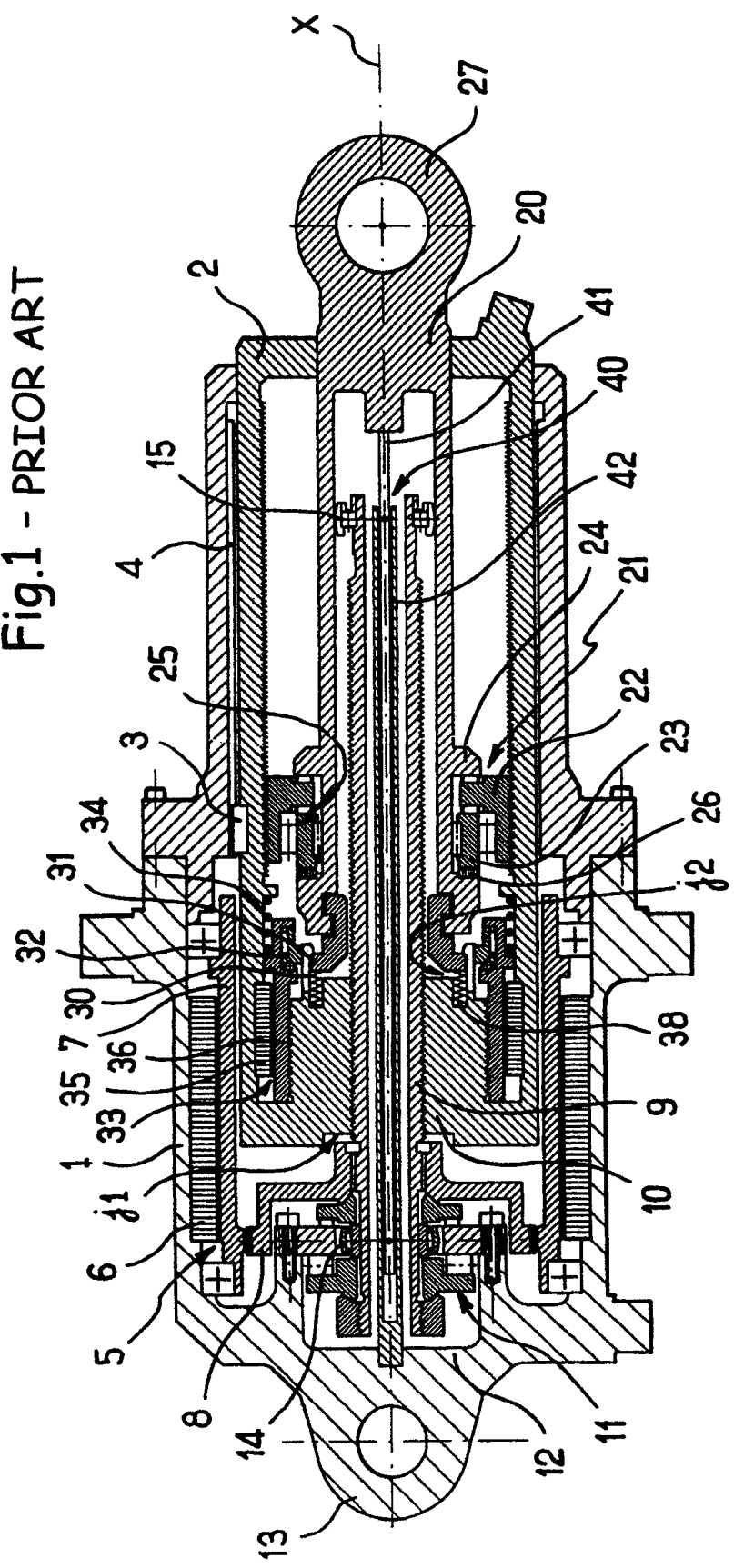
Figure 2:
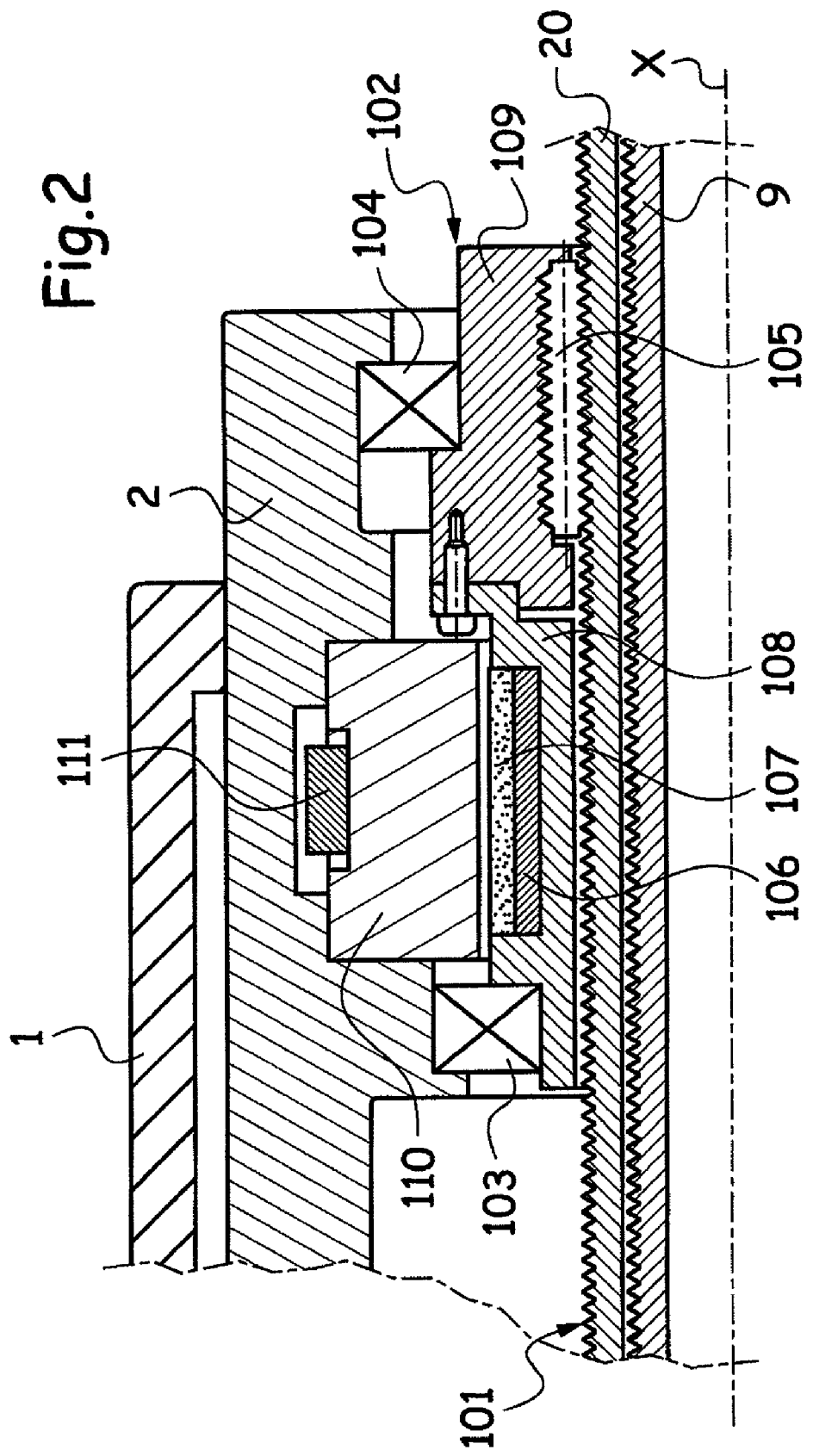
FIG. 2 is a fragmentary half-view in diagrammatic section of an actuator constituting a particular embodiment of the invention. References to parts in common with those in FIG. 1 have been retained.

The actuator of the invention shown in FIG. 2 is essentially similar to the prior art actuator shown in FIG. 1.

It still has a cylinder 1 in which a main rod 2 is mounted to slide telescopically. An auxiliary rod 20 is mounted to slide inside the main rod 2 via an outside thread 101 on the auxiliary rod 20. In addition, although not visible in this figure, it has the same controlled retaining means 30, 31, 32, 33 for retaining the auxiliary rod 20 in its retracted position inside the main rod 2, which means are therefore not described again here.

The difference lies in the way in which the auxiliary rod 20 is guided inside the main rod 2, and in the way in which the auxiliary rod 20 is braked relative to the main rod 2 when the auxiliary rod 20 is released.

More precisely, the auxiliary rod 20 has a thread 101 on its outside surface. The main rod 2 receives at its end a bearing 102 that is mounted to rotate relative to the main rod 2 by means of ball bearings 103 and 104. The rotary bearing 102 is connected to the auxiliary rod 20 via a reversible helical connection via threaded satellite rollers 105 that extend between the auxiliary rod 20 and the rotary bearing 102 such that extending the auxiliary rod 20 causes the rotary bearing 102 to rotate.

Thus, the actuator of the invention includes a rotary bearing that is disposed at the end of the main rod 2 and that centers the auxiliary rod 20 inside the main rod 2. The end of the auxiliary rod 20 that extends inside the main rod 2 carries a smooth bearing (not visible here) that slides inside the main rod, which main rod now has an inside wall that is smooth. Compared with the prior art disposition shown in FIG. 1, the bearings are interchanged: the rotary bearing 102 is now placed at the end of the main rod 2 and no longer moves with the auxiliary rod 20, while the smooth bearing is now placed at the end of the auxiliary rod 20 and therefore moves with the auxiliary rod 20.

The actuator of the invention comprises brake means for braking the auxiliary rod 20, which means act on the rotary bearing 102 to brake its rotation. More precisely, the brake means comprise:

a rotor 106 placed on the rotary bearing 102 to rotate together therewith. The rotor 106 is here made of pure iron and receives permanent magnets 107 that are disposed at the periphery of the rotor. In a variant, the rotor 106 could be made of magnetic steel. It should be observed that the rotary bearing 102 is made up of two portions 108 and 109, the portion 108 that carries the rotor 106 being made of a material that is not magnetic, e.g. a non-magnetic stainless steel; and a stator 110 carried by the main rod 2 and prevented from rotating by a key 111. The stator is made of a non-magnetic conductive material.

The rotor 106 and the stator 110 interact magnetically such that when the rotary bearing 102 and thus the rotor 106 rotates, an opposing electromagnetic torque is established that tends to brake the rotation of the rotary bearing 102, and thus to brake the extension of the auxiliary rod 20. These magnetic brake means are purely passive and they exert a braking force on the auxiliary rod 20 that is proportional to the speed of rotation of the rotary bearing 102, and thus to the speed at which the auxiliary rod 20 is being extended.

The brake means thus act directly on the element (the rotary bearing) that is in helical connection with the auxiliary rod 20.

The invention is not limited to the above description, but on the contrary covers any variant coming within the ambit defined by the claims.

In particular, although the brake means are shown as being of purely magnetic type, it would be possible to use other brake means, for example friction brake means.

What is claimed is:
1. A telescopic actuator comprising:
a main rod;
an auxiliary rod;
a cylinder in which the main rod is mounted to slide telescopically along a sliding axis between a retracted position and an extended position, the auxiliary rod being mounted to slide telescopically in the main rod along said sliding axis between a retracted position and an extended position, a controlled retaining means selectively operable for retaining the auxiliary rod in the retracted position inside the main rod or releasing the auxiliary rod so that the auxiliary rod is free to move with respect to said main rod, and brake means for braking sliding of the auxiliary rod in the main rod in the extension direction, said braking means being distinct of retaining means, wherein the auxiliary rod has a thread on an outside surface, wherein the main rod carries at its end a rotary bearing that centers the auxiliary rod inside the main rod, wherein a reversible helical connection is disposed between the rotary bearing and the thread of the auxiliary rod, wherein the main rod co-operates via the reversible helical connection with the thread of the auxiliary rod such that extension of the auxiliary rod causes the rotary bearing to rotate, and wherein the brake means is arranged to brake rotation of the rotary bearing during extension of the auxiliary rod.

2. An actuator according to claim 1, wherein the reversible helical connection between the auxiliary rod and the rotary bearing includes threaded satellite rollers.

3. An actuator according to claim 1, wherein the brake means comprise a rotor carried by the rotary bearing and a stator carried by the main rod, the stator and the rotor being in magnetic interaction to generate an opposing torque when the rotary bearing rotates.

4. An actuator according to claim 3, wherein the rotor carries permanent magnets, and the stator is made of a non-magnetic conductive material.

* * * * *